Sept. 4, 1956 J. N. MARSHALL ET AL 2,761,509

TAPE PERFORATING APPARATUS

Filed March 26, 1953 2 Sheets-Sheet 1

INVENTORS
John S. Baer &
John N. Marshall

BY Morris L. Rabkin
ATTORNEY

Sept. 4, 1956 J. N. MARSHALL ET AL 2,761,509

TAPE PERFORATING APPARATUS

Filed March 26, 1953 2 Sheets-Sheet 2

INVENTORS
John S. Baer &
John N. Marshall
BY Morris Rabkin
ATTORNEY 2,761,509

TAPE PERFORATING APPARATUS

John N. Marshall, Bryn Mawr, Pa., and John S. Baer, Woodbury, N. J., assignors to Radio Corporation of America, a corporation of Delaware Application March 26, 1953, Serial No. 344,754

15 Claims. (Cl. 164—111)

This invention relates to apparatus for perforating tape in accordance with coded signals to produce a code pattern of perforations in the tape.

Coded signals are symbolized on paper tape by the presence and absence of perforations at various points across the breadth of the tape. Each perforation pattern symbolizes a particular group of coded signals, or a character, which in turn may represent numeric, alphabetic or other information.

The conventional tape perforator or reperforator in teletypewriter operations is based on a system of reciprocating punches. In a common arrangement, each actuation of a typewriter key or the reception of signals for each character results in two operations on the punches. First, the proper punches are selected or conditioned to be actuated, and then they are actuated to perforate the tape. The use of reciprocating punches entails a number of mechanical operations which are time consuming due to the physical inertia of the mechanical elements. Furthermore, the punch selection and actuation operations also consume a significant amount of time for each perforation. Sufficient time is generally available between actuation of the typewriter keys or the reception of character signals in telegraph operations to permit the relatively large time periods required for perforating each character in the tape.

In large scale information handling machines, such as electronic digital computers, perforated tape is used as an information storage medium and for many special purpose devices. However, the use of perforated tape in the machines is limited, because of the relatively low perforating speeds available with conventional perforators. For example, it may be desirable to transpose information stored on magnetic tape to perforated tape. A conventional perforator is not fast enough to be operated at minimum speeds for magnetic tape read out, and thus, it slows up operations of the information handling machine.

Accordingly, it is an object of this invention to provide a novel tape perforator.

Another object of this invention is to provide a fast action tape perforator.

Still another object of this invention is to provide a simple tape perforator which is reliable in operation at high speeds and relatively economical in construction.

Yet another object of this invention is to provide an information storage device useful with a tape perforator.

A feature of this invention by which these objects are achieved is the utilization of a pair of rotating drums, the punches being mounted in one of the drums and the die openings formed in the other.

Another feature of this invention is the utilization of means for preconditioning selected perforating elements before a prior perforation operation is completed.

Still another feature of this invention is the utilization of an information storage device in one of two drums which mount the punches and die openings, whereby the perforating elements in that drum may be selectively conditioned for perforating prior to being placed in perforating position.

The above and other objects of this invention are achieved by utilizing a pair of drums continuously rotating tangentially to each other. Punches are mounted in the first of the drums circumferentially around the drum and in a series of rings axially along the drum. The punches are spring-biased outwardly so that they are always in perforating condition. The second drum is formed as a die with die openings extending through the cylindrical surface. The die openings are also arranged in a series of rings to receive the punches as the drums rotate. The tape is fed between the drums, and it is continuously perforated as the drums rotate. All of the die openings are blocked by balls being inserted in the openings at an erasing station spaced from the perforating station. The die drum is rotated so that the blocked die openings are then moved past an information entering station. At this station, a selector mechanism is operated in accordance with incoming encoded electric signals to remove selected ones of the balls in the positions where perforations are required by the signals. Others of the balls are left in blocking position where the absence of perforations is required. The die drum continues to rotate so that the blocked and unblocked die openings are moved to the tape perforating station. At this station, certain ones of the punches move into the unblocked die openings to perforate the tape. Other ones of the punches are restrained by the balls in the blocked die openings, and the tape is unperforated in these positions. Thus, the tape is perforated and left unperforated in accordance with the encoded signals. By means of this apparatus, tape perforation may be a continuous process so that relatively high speeds can be attained.

The features of this invention, as well as the invention itself, may be better understood from the following description when read together with the accompanying drawings, in which.

Figures 1, 2, 3, 4, 5:
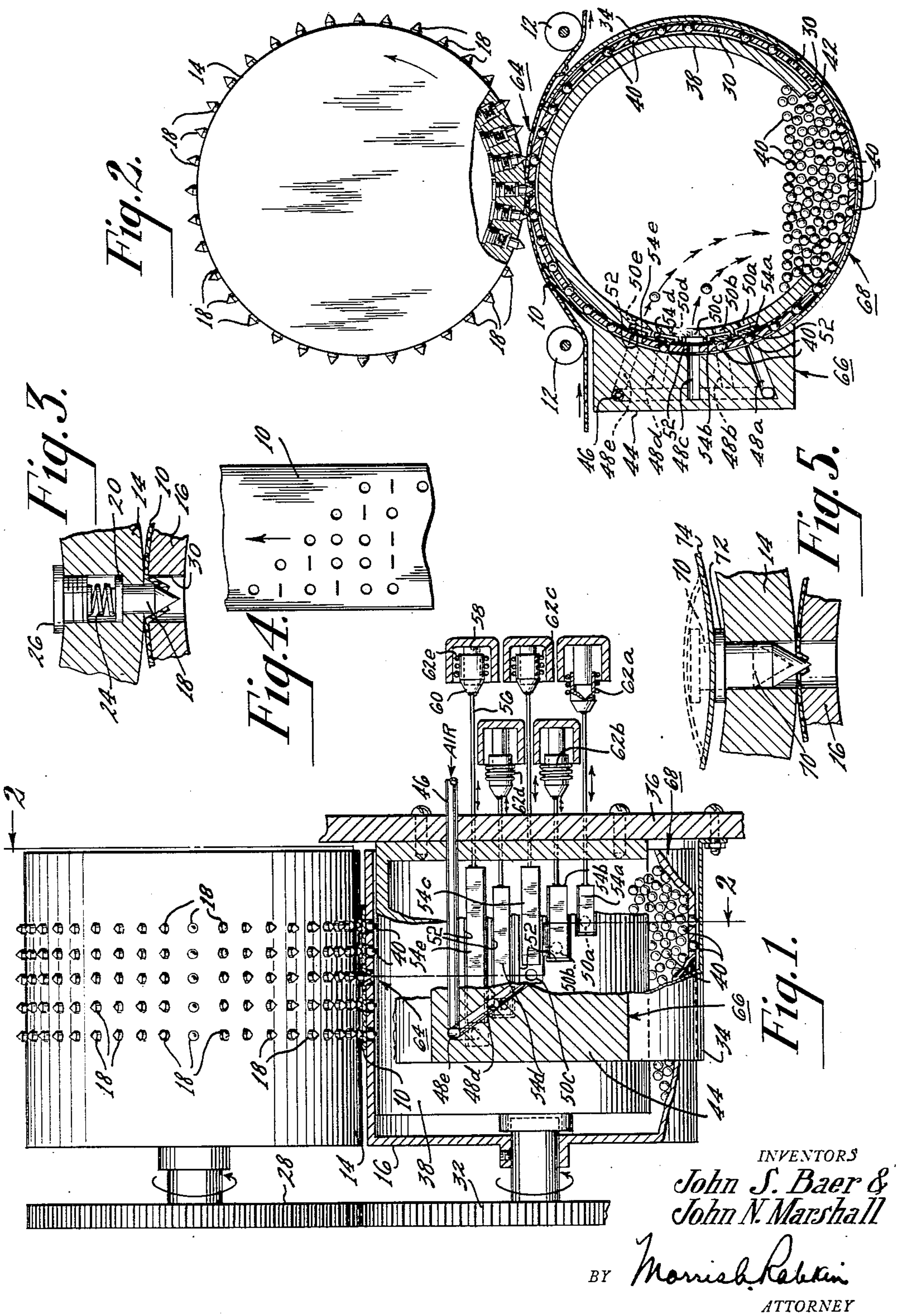
Figure 1 is a side view of perforator apparatus embodying this invention with parts cut away to show constructional features.
Figure 2 is an end view of the apparatus partly in section along the line 2—2 of Figure 1 with parts cut away.
Figure 3 is an enlarged detail of a punch and die opening.
Figure 4 is an illustrative diagram of a strip of perforated tape.
Figure 5 is an enlarged detail of an alternative form of punch.

Referring now to Figures 1 through 4, there is shown a tape-perforating apparatus embodying this invention. The tape 10 may be supplied from reels (not shown) in the usual manner and fed by means of a sprocket wheel (not shown) and idler rollers 12 between a first and second drum 14 and 16 which are mounted tangentially to each other. The first drum 14 has a plurality of rings (five by way of illustration) of punches 18 mounted circumferentially around the drum. The punches 18 may be in the form of conically-pointed pins (Figure 3) having shoulders 20 which rest against counterbored holes 22 in the drum 14. The pins are biased outwardly of the drum by means of springs 24 which are held in place by means of threaded bolts 26. The first drum 14 may be formed in two semicylindrical sections in order to permit counterboring. The punches 18 are uniformly spaced in each ring around the drum with the same number of punches in each ring so that a line of punches, one from each ring, lies in the same radial plane. The first drum 14 is fixed to and rotated by a gear 28.

The second drum 16 is of the same diameter as the first drum 14, and has five rings of cylindrical die openings 30 bored through and arranged circumferentially around it. Each ring has the same number of die openings 30 as there are punches 18 in each of the rings in the first drum 14, and they are spaced uniformly in the same manner as the punches. The second drum 16 thereby provides the mating die for receiving the punches. The second drum is also fixed to and rotated by a gear 32 of the same size as the gear 28 fixed to the first drum. The gears 28, 32 mesh and may be driven by a motor through a gear drive (not shown). A cylindrical shell or shield 34 fits closely around the second drum 16 and is fixed to a support member 36. The shield covers the die openings 30 all around the second drum except for a cutaway segment at the top where the punches meet the die openings. A supply-hopper cylinder 38 is mounted concentrically within the second drum 16 and is also fixed to the support member 36. The supply hopper contains a supply of spherical steel balls 40 of diameter slightly smaller than that of the die openings 40. The supply-hopper cylinder has a segment cut away at its lower portion which functions as a delivery opening 42.

At one side of the cylindrical shield 34, an air manifold 44 is joined to it. A source of air under pressure (not shown) is connected to the inlet 46 of the manifold 44. There are five outlets **48*a* to 48*e* from the manifold extending through the shield 34 onto the second drum 16. Each of these manifold outlets 48*a* to 48*e* lies in the plane of a different one of the rings of die openings 30, and they are spaced circumferentially around the shield 34 the same distance as that between the rows of die openings to form an oblique line of staggered openings. Associated with and aligned with each of the manifold outlets 48*a* to 48*e* is a ball-return opening 50*a* to 50*e*, respectively, through the supply-hopper cylinder 38**.

The supply-hopper cylinder has five grooves 52 extending axially in the outer surface of the cylinder, one for each one of the ball return openings **50*a* to 50*e*. Slidable in each one of these grooves is a flat shutter plate 54*a* to 54*e*. The shutters 54*a* to 54*e* have different lengths so that they normally overlie and close the associated ball-return openings 50*a* to 50*e*. Each shutter plate 54*a* to 54*e* has one end connected to a stiff wire 56 which is in turn connected to the armature of a separate solenoid. Each solenoid is preferably of the type well known in dynamic loudspeakers and includes a magnetic yoke and a fixed magnet 58 and a spring-biased paper cup 60 having one of the electrical voice coils 62*a* or 62*e* wound thereon. The shutter wire 56 is connected to the paper cup 60** to provide a sensitive fast-acting device.

The first and second drums 14, 16 are continuously rotated with the tape 10 passing between them at a tape-perforating station 64. As the drums rotate, each of the die openings 30 mates with a punch 18 and the punch tends to move into the die opening under spring bias to perforate the tape. If there is no spherical ball 40 interposed in a die opening, the associated punch punctures the tape 10 and enters the die opening. However, if there is an interposer ball in the die opening, the punch is blocked and moved back into the first drum against the force of the spring 24, and the tape is left unperforated. The outer surface of the supply hopper 38 supports the balls in the die openings and backs them up to block the punches.

The punches in the first drum are always biased outwardly and, therefore, are in condition to perforate the tape if they are not blocked by interposer balls in the associated die openings. The condition of the die openings determines whether or not the tape is to be perforated, and the conditioning of the die openings takes place before they are rotated to the tape-perforating station 64.

The supply hopper is partially filled with the spherical interposer balls 40 which roll out of the delivery opening 42 into the die openings 30 in the second drum 16. Following the travel of one die opening, say one in the middle ring, it receives an interposer ball as it is rotated past the delivery opening. The die opening is then rotated between the manifold outlet **48*c* and the ball-return opening 50*c* for that ring. There, the ball is removed or not according to whether or not an electrical signal is applied to the associated voice coil 62*c*. If the voice coil 62*c* receives an energizing signal, the shutter 54*c* connected thereto is actuated and is pulled a short distance away from its blocking position over the ball-return opening 50*c*. Air under pressure is continuously being applied through the manifold 44 to the ball in the die opening as it moves past. Therefore, when the ball-return opening is not blocked by its shutter, the ball then moving past is blown through into the supply-hopper 38. The ball-return openings are somewhat larger than the balls in order that a ball can be blown through as the second drum rotates. In this way, the die opening is pre-conditioned or activated for a punching operation. When an electrical signal is not received by the voice coil 62*c*, the shutter 54*c* remains closed and the interposer ball moving past at that moment remains in the die opening. The drum continues to rotate so that the die opening is then moved past the tape-perforating station 64**. Thus, the tape is perforated or not according to whether the voice coil receives an energizing signal or not.

This same cycle of operation occurs, at the same time, for the die openings in each one of the rings. However, because of the staggered arrangement of manifold outlets and ball-return openings, the balls are removed from the die openings in the different rings at different rotational positions. By means of this arrangement, a simple shutter construction and control is possible.

The common arrangement in perforated tape is to have each line of perforations perpendicular to the length of the tape represent a code group or character. With apparatus embodying the present invention, a diagonal line of perforations may represent a character. For example, if the first code group to be perforated is represented by five electrical signals, all of the voice coils **62*a* to 62*e* are energized simultaneously. Consequently, all of the ball-return openings 50*a* to 50*e*** are unblocked, and the balls are removed from the diagonal line of die openings passing at that moment. When these die openings reach the tape-perforating station, a diagonal line of perforations is produced, as shown in Figure 4. Each subsequent group of code signals is also produced as a diagonal line of perforations and the absence thereof (the absence of a perforation is shown as a dash). With this system, a perforated-tape reader or transmitter has its sensing elements or feelers staggered in corresponding fashion so that it simultaneously reads a diagonal line of perforations.

Apparatus embodying this invention may also be used where a perpendicular line of perforations represents a character in the usual manner. In that case, the electrical code signals representing a character are put in staggered form before they are applied to the voice coils. Considering a perpendicular line of die openings in the second drum, when the die opening of the first ring is opposite the ball-return opening **50*a* for that ring, the signal for that perforation is applied to the associated voice coil 62*a*. After a predetermined time interval, when the die opening of the second ring is opposite the next ball-return opening 50*b***, the next signal is applied to the associated voice coil 62*b*, and so on in staggered fashion. Therefore, when the perpendicular line of die openings reaches the tape-perforating station 64, the presence and absence of balls is representative of the group of code signals.

Where the electrical code signals that make up a character are initially in parallel, coincident form, they may be converted to a parallel staggered form by a series of five electrical delay lines of different time lengths. A signal for the first ring, through a first delay line, is delayed the smallest amount, or not at all, and the signal for the last ring, through a fifth delay line, is delayed most. One form of delay line that may be used for this purpose is a stepping register of the type described in U. S. Patent 2,580,771, and another form is a static magnetic delay line of the type described by An Wang in Proc. of the I. R. E., April 1951, page 401. Another way to stagger the electrical signals is to remove them in staggered fashion from the source. Thus, if the signals initially come from a magnetic drum or magnetic tape, the magnetic reading heads may be staggered so that the drum or tape is read in staggered fashion to complement the staggering effect in the tape perforator.

The second drum 16 in the tape perforator functions as an information storage device. Information is stored in digital form in the drum and is represented by the absence and presence of a ball. The information is entered by removing a ball from or leaving it in a die opening at an information-entering station 66. The stored information is read out of the drum at the tape-perforating station when the tape is perforated. The cycle is completed at an erasing station 68, where balls are delivered to each of the die openings from the supply hopper.

An alternative arrangement for mounting the punches in the first drum 14 is shown in Figure 5. The punches 70 are in the form of pins, as previously described, but instead of counterboring the drum and using coil springs to bias them as in Figure 1, the pins 70 are inserted with the heads 72 resting against the inner surface of the drum 14. Five annular leaf springs 74 are fixed within the drum, one for each ring of punches. Each spring 74 presses against the heads of all of the pins in the same ring so as to bias them outwardly.

Figures 6, 7, 8:
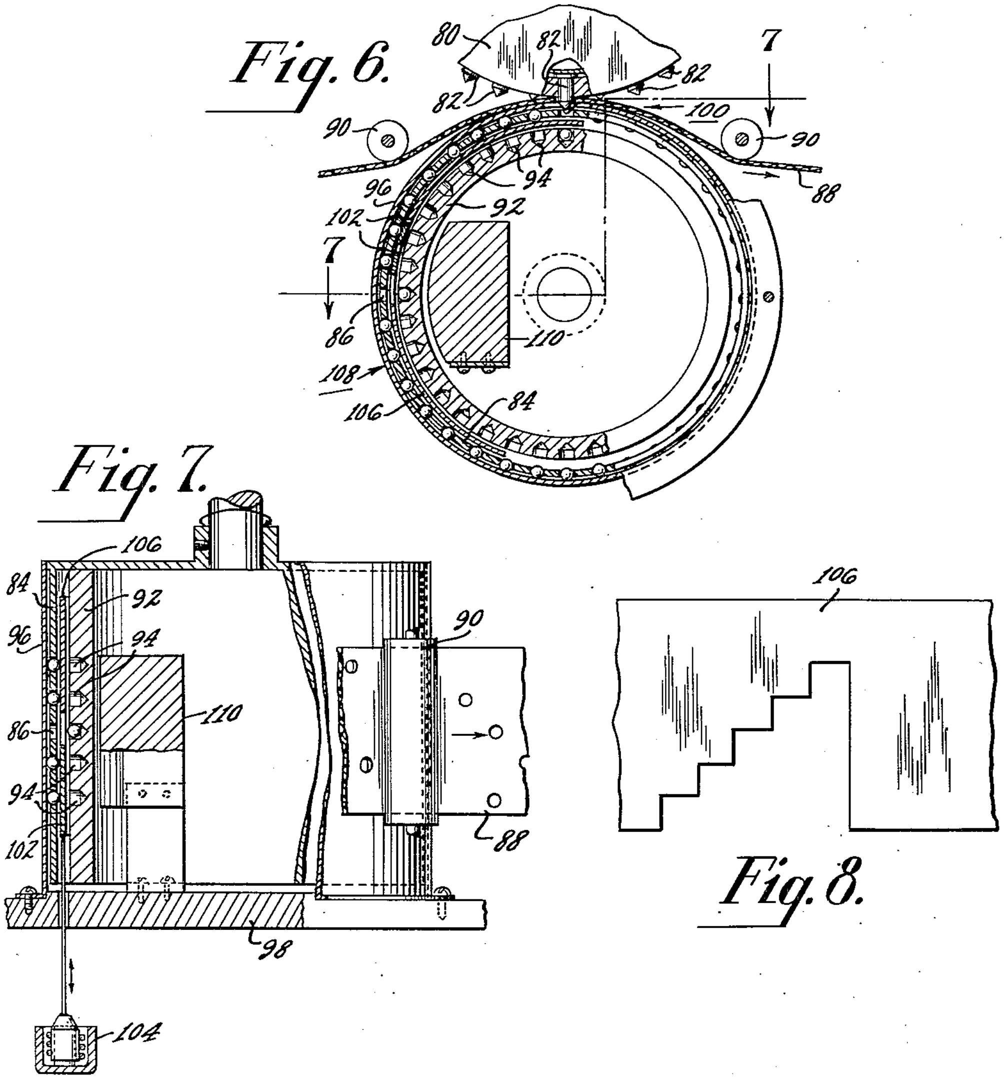
Figure 6 is an end view of an alternative form of tape perforator apparatus embodying this invention.
Figure 7 is a view partly in section taken along the line 7—7 of Figure 6.
Figure 8 is a detail view of a backing plate.

Another embodiment of this invention is shown in Figure 6. The first drum 80 carries five rings of punches 82 and the second drum 84 has five rings of die openings 86 formed around its circumference in the manner previously described. The drums 80, 84 are driven together, and the tape 88 is fed around rollers 90 between them. An inner drum 92 is fixed to and concentric with the second drum 84. The inner drum 92 has ball-retaining pockets 94 cut in its outer surface, one pocket for each die opening, which pockets 94 are arranged in rings and radially aligned with the die openings 86 in the second or outer drum 84. There is a cylindrical shield 96 concentrically mounted around the outer drum 86, and fixed to a support member 98. The cylindrical shield extends all of the way around the drum except for a cut-away segment at the tape-perforating station 100.

Resting between the outer drum 84 and the inner drum 92 at one side thereof are five shutter plates 102 which are spaced from each other the distance between two die openings. These shutters 102 are mounted, in the manner of the first-described embodiment, for sliding movement axially of the second drum 84, under the control of separate voice coils 104. The shutters 102 block movement of the interposer balls from the die openings 86 to the ball-retaining pocket 94, and they are of varying length so that the balls in five staggered die openings are controlled at any one moment. A cylindrical backing plate 106 is mounted between the inner drum and the outer drum and is fixed to the support 98. The backing plate is notched to receive the shutters and extends from the shutters 102 at the information-entering station 108 to the tape perforating station 100 and a short distance beyond. A powerful permanent magnet 110 is mounted within the inner drum 92 and is fixed to the support 98. The magnet is located at the information entering station 108 adjacent the shutter plates 102. The inner and outer drums, the shutters and backing plate are made of non-magnetic material such as brass.

A steel interposer ball is placed in each one of the pockets 94 of the inner drum 92. As the drums 84, 92 rotate together from the tape-perforating station 100 to the information-entering station 108, the speed of rotation of the inner drum 84 is such as to provide a centrifugal force great enough to move the balls out of the pockets 94 into the die openings 86. Thus, when the die openings move past the information-entering station 108, the interposer balls have all been moved into the die openings. The shutters 102 are normally positioned to block the attraction of the balls back into the inner drum pockets 94 by the magnet 110. When a voice coil is actuated in response to the coded electrical signals, the corresponding shutter 102 is moved to permit a ball to be moved from the outer drum to the inner drum by the magnetic force. As the drums 84, 92 continue to rotate from the information entering station 108, they pass on opposite sides of the backing plate 106 so that the balls cannot move back from the inner drum to the outer drum. As the die openings move past the tape-perforating station 100, the punches 82 move into the die openings or are blocked from such movement according to whether or not the interposer balls have been removed. The backing plate 106 supports the interposer balls as they block the punches 82.

Instead of a magnet for producing the force that moves the balls from the outer to the inner drum, an air manifold for applying air under pressure to the balls may be used in the manner described above.

Figure 9:
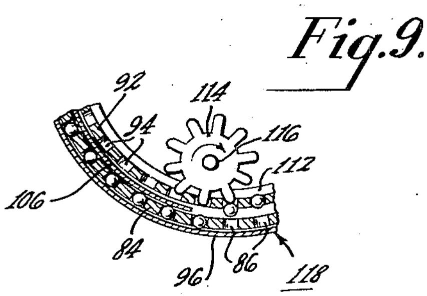
Figure 9 is a fragmentary sectional view of another modified form of tape perforator apparatus embodying this invention.

A modified arrangement for moving the interposer balls from the inner drum 92 to the outer drum 84 is shown in Figure 9. Each of the rings of ball-retaining pockets 94 is slotted. Each slot 112 is narrower than the diameter of the interposer balls and passes through the bottom of the pockets 94 circumferentially around the inside surface of the inner drum 92. Five, relatively thin, toothed wheels 114 are mounted for passage within the slots 112 and are rotatable on a shaft 116 fixed to a support member and positioned adjacent the lower part of the inner drum. The teeth of the wheels are arranged to enter successive pockets 94 and to be engaged by the walls dividing the pockets. Thus, as the inner drum rotates, the toothed wheels are rotated with successive teeth passing into successive pockets. If there is an interposer ball in a pocket 94 it will be forced out into the associated die opening 86 in the outer drum 84. In this way, all of the interposer balls are returned to the die openings in the outer drum at the erasing station 118 and are retained there by the backing plate 106 as they rotate to the information-entering station 108.

It is seen from the above description that a simple and fast-action tape perforator is provided.

What is claimed is:

1. Apparatus for perforating tape comprising a first and a second support member, a plurality of perforating elements on each of said support members, said perforating elements including punches and a die having die openings, each of said punches being mounted on said first support member, said die being mounted on said second support member, electrical signal responsive selector means adjacent one of said support members including means selectively to block or to leave open selected ones of said die openings to precondition for subsequent perforating several selected ones of said perforating elements thereon while prior perforating operations are being performed, and means for moving said punches into said die openings.

2. Apparatus for perforating tape comprising a first and a second rotatable cylinder, a plurality of perforating elements in each of said cylinders, said perforating elements including punches and die openings, each of said punches being mounted in said first cylinder, each of said die openings being formed in said second cylinder, electrical signal responsive selector means, including means selectively to block or to leave open selected ones of said die openings, for conditioning for perforating selected ones of the perforating elements in one of said cylinders while said one cylinder is rotating, means rotatably supporting said first and second cylinders tangentially to each other to receive tape therebetween, and means for continuously rotating said cylinders to move said punches and die openings into perforating position adjacent said tape.

3. Apparatus for perforating tape comprising a first and second cylinder, a plurality of perforating elements including punches and die openings for cooperation with said punches, each of said punches being movably mounted in one of said cylinders, each of said die openings being formed in the other of said cylinders, said first and second cylinders being rotatably mounted tangentially to each other at a first station to receive tape therebetween and said second cylinder being rotatable past a second and conditioning station spaced from said first station, the perforating elements in said first cylinder being maintained in perforating condition, signal responsive means mounted adjacent said second cylinder at said second station for selectively controlling the condition of said perforating elements therein, and means for rotating said cylinders to move said punches and die openings into engagement adjacent said tape.

4. Apparatus for perforating a record in accordance with coded signals representing information characters to produce a coded perforation pattern in said record comprising a first and a second drum, a plurality of perforating elements including punches and die openings, said punches being peripherally mounted in a plurality of channels on one of said drums, said die openings being formed in the other of said drums and being peripherally arranged in a corresponding plurality of channels, means rotatably supporting said first and second drums tangentially to each other to receive said record therebetween, means for rotating said drums to move said punches and die openings into perforating position adjacent said record, each of said perforating elements on said first drum having an active and inactive state, means to change said first drum perforating elements to one of said active and inactive states, and a plurality of signal responsive selector devices mounted adjacent said first drum each corresponding to a different channel for selectively changing preselected ones of said first drum perforating elements to the other of said active and inactive states to produce perforating patterns of active and inactive elements before said elements are moved into perforating position.

5. Apparatus for perforating a record in accordance with coded signals representing information characters to produce a coded perforation pattern in said record comprising a first and a second rotatable support member, a plurality of perforating elements including punches and a die having die openings, said punches being peripherally mounted in a plurality of said support members, said die being mounted on the other of said support members, said die openings being arranged in a corresponding plurality of channels, means for continuously rotating said support members to move said punches and die openings into perforating position, each of said perforating elements having an active and inactive state, means to change said first member perforating elements to one of said active and inactive states after said elements move out of perforating position, and a plurality of signal responsive selector means each corresponding to a different channel mounted adjacent said first support member for selectively changing certain ones of said first support member perforating elements to the other of said active and inactive states to produce perforating patterns of active and inactive elements before said elements are moved into perforating position.

6. Apparatus for perforating tape comprising a first drum, a plurality of punches mounted thereon, a second drum having a plurality of openings therein to form a die for said punches, means rotatably mounting said first and second drums tangentially to each other to receive tape therebetween, a plurality of blocking elements at the respective die openings for preventing movement of said punches into said die openings, an electrical signal responsive selector mechanism for controlling the positioning of said blocking elements in blocking and unblocking relation to said punches, and means for continuously rotating said drums whereby preselected perforations in said tape are punched.

7. Apparatus for perforating tape comprising a first and a second drum, a plurality of perforating elements in each of said drums arranged in rings circumferentially therearound, said perforating elements including punches and die openings, each of said punches being mounted in one of said drums, each of said die openings being formed in the other of said drums, said first and second drums being rotatably mounted tangentially to each other to receive tape therebetween, a tape perforating station between said drums, the perforating elements in said first drum being maintained in perforating condition, an information entering station located adjacent said second drum and spaced from said tape perforating station, means for inactivating the perforating elements in said second drum during movement from said tape perforating station to said information entering station, signal responsive means at said information entering station for activating preselected ones of said second drum perforating elements to perforating condition, and means for rotating said drums to move said first drum perforating elements into perforating position at said tape perforating station and said second drum perforating elements sequentially from said tape perforating station to said information entering station and back to said tape perforating station.

8. Apparatus for perforating tape as recited in claim 7 wherein said punches are mounted on said first drum and said die openings are formed in said second drum, said inactivating means includes means for delivering blocking elements to said die openings, and said activating means includes means for removing blocking elements from said die openings.

9. Apparatus for perforating tape as recited in claim 8 wherein said activating means further includes separate shutter means for each of said rings to prevent removal of said blocking elements from said die openings.

10. Apparatus for perforating tape as recited in claim 8 wherein said means for removing blocking elements includes means for continuously applying a force to said blocking elements moving past said information entering station.

11. Apparatus for perforating tape as recited in claim 8 wherein said means for delivering blocking elements to said die openings includes a stationary ball supply hopper mounted within said second drum and having a delivery opening adjacent said die openings.

12. Apparatus for perforating tape as recited in claim 8 wherein said means for delivering blocking elements to said die openings includes a ball retaining cylinder concentrically mounted within and rotatable with said second drum and having a plurality of ball retaining pockets circumferentially disposed around said cylinder and radially aligned with said die openings.

13. Apparatus for perforating tape comprising a support member, a plurality of punch elements arranged in series and mounted on said support member yieldably biased in position for punching, a die mounted adjacent said punch elements and having a plurality of openings therein arranged in series, means for feeding tape between said punch elements and die, means for moving said punch elements into said die openings to perforate said tape, a plurality of blocking elements for blocking movement of said punch elements into said die openings to prevent perforation of said tape, and an electrical signal responsive selector mechanism for individually controlling the positioning of each of said blocking elements in blocking and unblocking relation to said punch elements whereby a preselected series of perforations are punched in said tape.

14. Apparatus for perforating tape comprising a support member, a plurality of punch elements mounted on said support member, a die member mounted adjacent said support member and having a plurality of die openings formed therein, means for moving said punch elements into said die openings to perforate said tape, a plurality of blocking elements, means for positioning said blocking elements in said die openings to block movement of said punch elements into said die openings, and an electrical signal responsive selector mechanism for removing certain individual ones of said blocking elements from said die openings whereby a preselected series of perforations are punched in said tape.

15. Apparatus for perforating tape comprising a first and a second drum, a plurality of perforating elements in each of said drums, said perforating elements including punches and die openings, each of said punches being yieldably mounted in said first drum around the periphery thereof, each of said die openings being formed in said second drum around the periphery thereof, means rotatably supporting said first and second drums tangentially to each other at a first station to receive tape therebetween, means for rotating said drums to move said punches and die openings into perforating position adjacent said tape at said first station, means for inactivating the perforating elements in one of said drums at a second station removed from said first station, and a selector device mounted adjacent said one drum at a third station for activating preselected ones of the perforating elements therein before said preselected perforating elements are moved into perforating position adjacent said tape.

References Cited in the file of this patent

UNITED STATES PATENTS

| | | |
|---|---|---|
| 617,012 | Griffin | Jan. 3, 1899 |
| 962,167 | Schiff | June 21, 1910 |
| 1,224,956 | Piersen | May 8, 1917 |
| 1,856,175 | Towle | May 3, 1932 |
| 2,006,999 | Nachumsokn | July 2, 1935 |
| 2,045,977 | Bryce | June 30, 1936 |
| 2,134,815 | Elliott | Nov. 1, 1938 |
| 2,684,719 | Johnson et al. | July 27, 1954 |